(12) United States Patent
Claiborne et al.

(10) Patent No.: US 8,743,389 B2
(45) Date of Patent: Jun. 3, 2014

(54) METHODS AND SYSTEMS RENDERING A PRINT JOB

(75) Inventors: Steve Claiborne, Boise, ID (US); Kristofer E. Metz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2452 days.

(21) Appl. No.: 11/602,616

(22) Filed: Nov. 20, 2006

(65) Prior Publication Data

US 2008/0117450 A1  May 22, 2008

(51) Int. Cl.
  *G06F 3/12*  (2006.01)
(52) U.S. Cl.
  USPC ....... 358/1.15; 358/1.16; 358/1.13; 358/1.18; 400/76
(58) Field of Classification Search
  None
  See application file for complete search history.

(56) References Cited

U.S. PATENT DOCUMENTS

| | | | |
|---|---|---|---|
| 5,129,049 A * | 7/1992 | Cuzzo et al. | 358/1.14 |
| 5,337,258 A * | 8/1994 | Dennis | 714/47.3 |
| 5,471,564 A * | 11/1995 | Dennis et al. | 358/1.15 |
| 5,768,487 A | 6/1998 | LeClair | |
| 5,933,586 A * | 8/1999 | Lee | 358/1.16 |
| 5,960,166 A * | 9/1999 | Brown et al. | 358/1.15 |
| 5,974,233 A * | 10/1999 | Nishiyama et al. | 358/1.16 |
| 6,055,065 A | 4/2000 | Rao et al. | |
| 6,091,506 A | 7/2000 | Payne et al. | |
| 6,186,682 B1 * | 2/2001 | Ishiyama | 400/76 |
| 6,373,586 B1 * | 4/2002 | Kim | 358/1.15 |
| 6,490,055 B1 | 12/2002 | Shimizu | |
| 7,016,061 B1 * | 3/2006 | Hewitt | 358/1.15 |
| 7,046,863 B2 | 5/2006 | Chang et al. | |
| 7,072,076 B2 | 7/2006 | Lapstun et al. | |
| 2002/0054344 A1 * | 5/2002 | Tateyama | 358/1.15 |
| 2004/0061892 A1 * | 4/2004 | Ferlitsch | 358/1.15 |
| 2004/0184106 A1 | 9/2004 | Ferlitsch | |
| 2005/0174349 A1 | 8/2005 | Watson | |
| 2005/0275883 A1 * | 12/2005 | Kobayashi et al. | 358/1.15 |

FOREIGN PATENT DOCUMENTS

| | | |
|---|---|---|
| JP | 2001-265556 | 9/2001 |
| WO | WO 2006/093694 A2 | 9/2006 |

* cited by examiner

*Primary Examiner* — King Poon
*Assistant Examiner* — Ted Barnes

(57) ABSTRACT

A printing system for processing a print job includes a host computer; and a printer in communication with the host computer. The host computer comprises a printer driver that determines whether each print job unit can be more efficiently rendered on the host computer or on the printer and processes the print job accordingly. A method of processing a print job includes determining whether each step in rendering a print job unit of the print job can be more rapidly completed on a host computer or on a printer, and rendering the print job accordingly.

22 Claims, 2 Drawing Sheets

METHODS AND SYSTEMS RENDERING A PRINT JOB

BACKGROUND

Computers can be used to generate a wide variety of electronic documents, records, and files. Frequently, the user may desire to have a hardcopy of an electronic document. Consequently, printers have been developed that can receive electronic data from a host computer and produce a hardcopy of the electronic document represented by that data. This includes such printing devices as laser printers, inkjet printers, plotters, facsimile machines, digital copiers, and the like.

Traditional printing operations entail a number of data language conversions as the print job progress from an electronic application data file to a printed hardcopy. Initially, the data for the electronic document is converted into a page description language (PDL) to aid in the transmission of the image data from the host computer to a printing device. This data is then sent from the host computer to a printing device through an Input/Output (I/O) port of the printing device.

Once the printing device receives the image data, likely written in a PDL, the information is converted to an intermediate form called a display list. A display list is a list of display commands that define graphic elements and their contexts within the image to be printed. These display commands are usually one of the three following types: characters or text, line drawings (also referred to as vectors), and images (also referred to as raster data).

The display list is an intermediate step in the processing of the image data. The display list is then parsed and converted into a final form. This conversion is known as rasterizing the image data. Once rasterized, the image data is sent to the print engine controller for processing and forming of the desired image on a print medium, such as paper.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
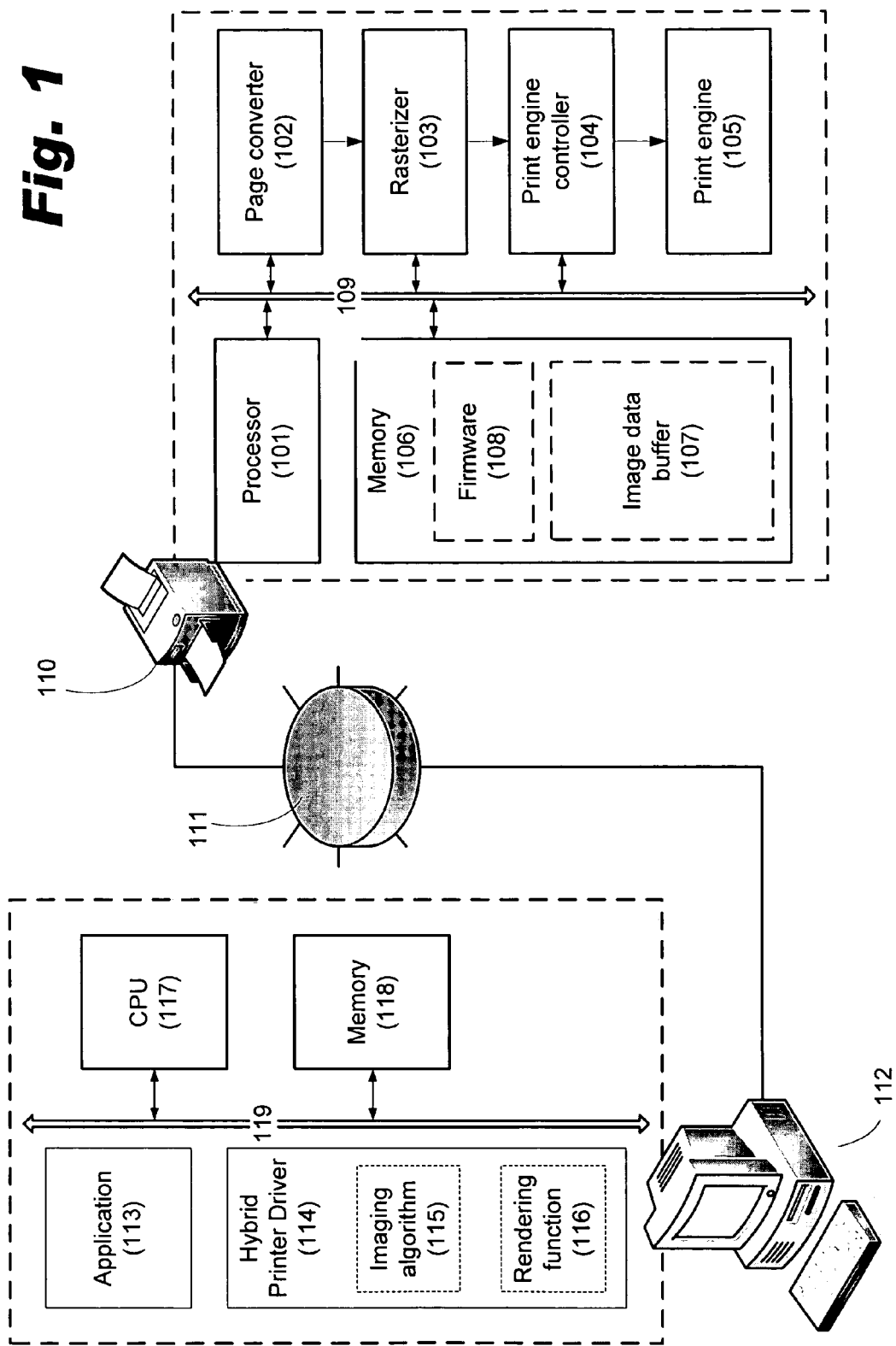
FIG. 1 is an illustration of an exemplary printing system, according to principles described herein, in which the system dynamically determines where some or all of a print job is most efficiently rendered, on the host or on the printer, and then processes the job accordingly.

Generally, print job data is taken from a file or data that has been created or is being used by an application that is running on the host computer that is submitting the print job. Such applications typically run under an operating system on the host computer and provide data to a printer driver, also running on the host computer, to initiate a print job.

As used herein and in the appended claims, the process of "rendering" a print job comprises the various language or format conversions that are performed on a print job data set before that data is ready for use by the print engine and print engine controller that will produce the desired hardcopy document. Consequently, "rendering" includes converting an application file or other data into a PDL-formatted print job; converting the PDL data through any number of additional intermediate language or format conversions, for example a display list; and rasterizing the print job data.

According to the traditional model described above, most printing systems process a print job with a printer driver on a host computer that converts a file, representing the image to be printed, into a PDL format for transmission to a printer. The printer then completes the rendering of the print job including rasterizing the image data before printing the desired hardcopy document.

While this is the conventional model, it is possible for more or all of the rendering of the print job to be performed on the host computer rather than by the printer. In fact, in some cases, due to the nature of the print job, the rendering process is more efficient if performed on the host computer rather than by the printer. However, this is not always the case. Sometimes the rendering is most efficiently performed by the dedicated hardware and firmware of the printer.

Current printing systems can experience significant performance degradation if an application utilizes unsupported or complex graphic primitives. An example of this issue is the use of transparencies. The imaging model in some operating systems does not efficiently handle transparency in a print job, so the printing system must translate the image into lower-level primitives, which are less efficient. Other performance issues arise because of the memory requirements of the print job and/or the available memory on the printing device. Low memory conditions on the printing device can slow a print job significantly, so the Hybrid driver will analyze the memory requirements of the job and the available on the device and make rendering decisions based upon this analysis.

Other applications simply generate poorly constructed graphics which result in inefficient rendering at the printer when the print job is transmitted. This situation has arisen, for example, with applications written for one platform that are then ported to another platform without full consideration of printing performance. Therefore, the resulting print job for a file originating with the ported application does not print efficiently. However, even some applications running on the platform for which they were written may still generate poorly constructed graphics that are difficult for a printer to render.

The present specification describes methods and systems that dynamically optimize printing by analyzing the printing system configuration and print job attributes to determine where rendering can be performed most efficiently and then performing the rendering of the image data at that optimal location or with that optimal part of the printing system. As noted above, some jobs are better rendered on the host; others are more efficiently rendered on the printer.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used herein including in the appended claims, the term "printer" or "printing device" will be used broadly to refer to any device that produces a desired hardcopy document using electronic data. As such, the terms "printer" and "printing device" include, but are not limited to, printers, including laser printers and inkjet printers; copiers; fax machines; multi-function peripherals, etc.

As used herein including in the appended claims, the term "toner" is used broadly to refer to any marking substance dispensed by a printer onto a print medium to produce a desired hardcopy document. As such, the term "toner" may include, but is not limited to, toner, ink, colorant, marking fluid, etc.

FIG. 1 is an illustration of an exemplary printing system, according to principles described herein, in which the system dynamically determines where some or all of a print job is most efficiently rendered and then processes the job accordingly. As shown in FIG. 1, a host computer (112) is connected to a printer or printing device (110).

The host computer (112) can be any computing device capable of supporting a printer driver (114) that prepares print job data for the associated printer (110). For example, the host computer (112) may be, but is not limited to, a personal computer, desktop computer, laptop computer, notebook computer, tablet computer, work station, mainframe, server, terminal, pocket computer, personal digital assistant, smart phone, mobile phone, digital camera, etc.

The network (111) may be any network including, but not limited to, a Local Area Network, a Wide Area Network or a global network such as the Internet. The network (111) may include some wireless networking or may be entirely wireless.

The printer (110) may be any device that produces a hardcopy document from electronic data. As indicated above, the printer (110) may be, but is not limited to, a laser printer, inkjet printer, plotter, facsimile machine, digital copier, multi-function peripheral and the like.

As shown in FIG. 1, the printer (110) includes a processor (101) that controls the various hardware and firmware systems of the printer (110). A memory (106) may include Random Access Memory (RAM) as well as non-volatile memory, for example, Flash memory. The memory (106) is used to store the firmware (108) executed by the processor (101). Additionally, the memory (106) includes an image data buffer (107) for buffering the data of a print job being processed by the printer (110).

A page converter (102) is used to process a print job that is received from a host computer (e.g., 112) in a PDL or similar format. The page converter (102) will convert the PDL print job into an intermediate language or format preparatory to rasterization. For example, the page converter (102) may convert the print job into a display list as described above.

A rasterizer (103) is used to rasterize print job data. Rasterization is the final conversion of the print job data into a form that can be used to control the print engine to produce the corresponding image or hardcopy document desired by the user.

A print engine controller (104) receives the rasterized print job and controls the corresponding print engine (105) accordingly. Using the rasterized print job, the print engine controller (104) drives the print engine (105) to selectively deposit toner on a print medium, such as paper, to produce a desired hardcopy document.

A bus (109) may be included in the printer (110) to interconnect the various components of the printer (100). This will allow the various components described herein to communicate with each other in a variety of configurations as will be described in more detail below.

As will be appreciated by those skilled in the art, FIG. 1 merely illustrates some of the principal components of the printer (110) and the host computer (112). Other components, not expressly described, will be included in various different examples of a printer or host computer adapted for use according to the principles described herein.

The host computer (112) also includes a bus (119) that interconnects, among other components, a central processing unit (CPU) (117) and a memory (118). As above, the memory (118) will include both RAM as well as non-volatile data storage, such as a hard drive or the like.

The host computer (112) may include one or more applications (113) that are stored in memory (118) and executed by the CPU (117). Such applications (113) can be executed as desired by users of the computer (112).

Frequently, such applications (113) are used to generate documents for which a hardcopy is desired. Accordingly, the printing system, as will be described below, takes a file used by the application (113) that contains the data for the document to be printed and generates a corresponding print job for transmission to the printer (110). It will be appreciated, however, that not all print jobs are produced using an application or application file. Other print jobs may be based on a screen shot of an application (113) or operating system, or other data set.

In a typical printing system, when a user desires to print a hardcopy document, the data representing that document, whether from an application file or other source, is passed to a printer driver. The printer driver, as described above, typically converts the data into a PDL format for transmission as a print job to the printer (110).

In the example of FIG. 1, the host computer (112) includes a hybrid printer driver (114). This hybrid printer driver (114) can be stored in the memory (118) of the host computer (112) and is typically executed as a background task when the computer (112) is booted or may be executed when a user chooses to print from an active application. Alternatively, a user can launch the hybrid printer driver when desiring it's functionality.

Like a traditional printer driver, the hybrid printer driver (114) receives data representing the document to be printed, whether from an application file or other source. However, rather than simply converting the data into a PDL format, the hybrid printer driver (114) will execute an imaging algorithm (115). This imaging algorithm (115) will make a determination, as described in further detail below, whether the print job, or a portion thereof, is most efficiently rendered by the host (112) rather than the printer (110).

The algorithm (115) may make this determination, for example, for each print job, for each page within a print job or for each strip within a page, or for 1 or more graphic objects within the page, of a print job. Therefore, different parts of a single print job may be processed differently based on the efficiency considerations of the imaging algorithm (115).

The hybrid printer driver (114) also includes a rendering function (116) that can be invoked to render parts or all of a print job if the host computer (112) can do so more efficiently than can the printer (110). The rendering function (116) can be programmed to handle different portions of the print job rendering process as best suits a particular application. For example, the rendering function (116) may be capable of rasterizing a print job, including converting the print job from a PDL format through any intermediate steps to a rasterized data set, for use directly by the print engine controller (104) of the printer (110). In other examples, the rendering function (116) may perform only one or some of the rendering steps traditionally performed by the printer (110), such as converting a PDL format print job into a display list, leaving rasterization to occur in the printer (110).

In any event, the rendering function (116) is used to perform those rendering tasks on certain print jobs or portions of a print job for which the host computer (112) can more efficiently complete those rendering tasks than can the associated printer (110). Consequently, the hybrid printer driver (114) can more efficiently process a print job than prior printer drivers.

Figure 2:
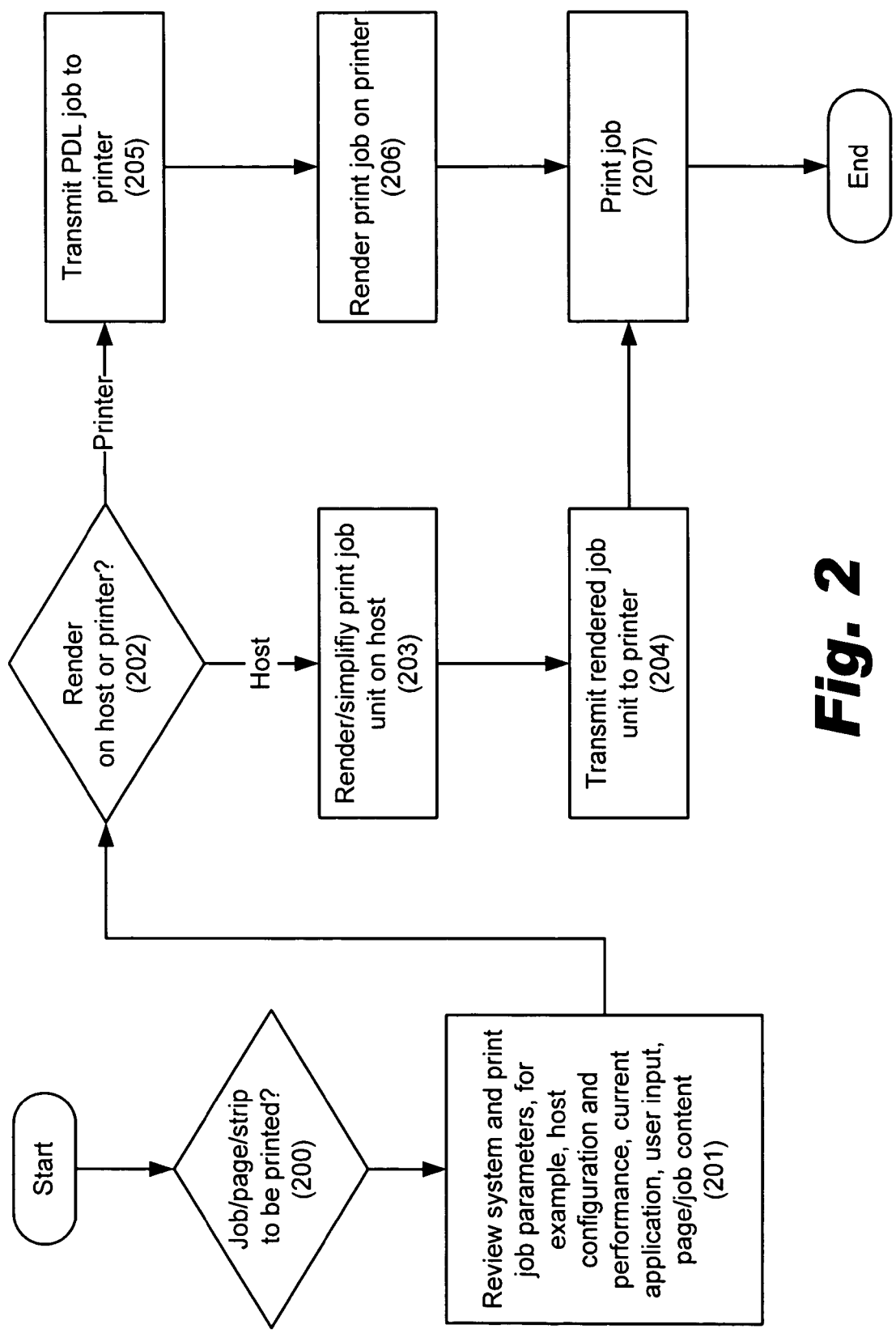
FIG. 2 is a flowchart illustrating an exemplary method, according to principles described herein, of operating the system of FIG. 1 to dynamically determine where some or all of a print job is most efficiently rendered and to process the job accordingly.

FIG. 2 is a flowchart illustrating an exemplary method, according to principles described herein, of operating the system of FIG. 1 to dynamically determine where some or all of a print job is most efficiently rendered and to process the job accordingly. As shown in FIG. 2, the method begins when a print job is being initiated by, for example, the hybrid printer driver (114) described above.

As noted above, for any given print job, a page of a print job or a strip of a print job page, it may be more efficient to render the data with either the host computer's resources or the printer's resources. Efficient in this context refers to rendering time, i.e., will the host computer's resources or the printer's resources be able to render the data in less time. Rendering time will be effected by two things: (1) processor operations (e.g. processor speed, memory access, calculations, data manipulation, etc.) and (2) memory availability, e.g., Random Access Memory (RAM). When memory is scarce, the rendering time of the page will be significantly increased. This is due primarily to the compression/decompression cycles that run to fit rendered objects into available memory. The host typically has more powerful processors and almost always has orders of magnitude more memory. Consequently, the host may frequently be the more efficient system for rendering. However, this is not always so. Consequently, when a print job is to be printed (determination 200), the rendering of that print job can be optimized by the job, by the page or by the strip by determining whether the host or the printer can render that job, page or strip more efficiently, i.e., more rapidly.

As used herein and in the appended claims, the term "print job unit" will be used to refer generically to a print job or a portion of a print job for which a determination is made whether rendering is more efficient on the host computer or the associated printer. As such, "print job unit" may refer to an entire print job, a page of a print job, a strip of a print job or other portion of a print job.

When a print job is to be printed (determination 200), the method will take into account various system and print job parameters to determine for each print job unit whether to render that print job unit on the host computer or the associated printer. (Step 201). For example, the method, which may be implemented by the hybrid printer driver (114) described above, will consider (1) the printer hardware, e.g., memory size, processor speed and capacity, etc.; (2) the host hardware and performance, e.g., memory available, processor speed and Input/Output capacity, etc.; (3) the current application, e.g., the application form which the print job data is to be received; (4) the content of the print job unit under consideration, e.g., does the print job unit contain graphics or text, what is the data density and data quality, etc.; (5) any applicable user input, e.g., override defaults, override applications, etc.; (6) the connection bandwidth between the host computer and printer, its capacity and speed; (7) whether the computer and printer are connected directly or by a network and whether any part of the connection is wireless; (8) whether the printer is shared by other host computers or is dedicated to a particular host; (9) balancing computational complexity between the host and printer; and (10) whether sending an already rasterized print job unit from the host to the printer will negatively impact the network connecting the two. A simple example of (9) is rasterizing Page 1, sending PDL for Page 2, . . . , rasterizing Page N−1, sending PDL for Page N. A more involved algorithm would be to keep a computation complexity count per object rendered, making the decision on where to render based on how busy the host and printer are with past objects. For example, the algorithm may monitor the render-queue for previous print job units and determine future rendering based, at least partially, upon queue depth. Consequently, the driver can balance the rendering load based upon outstanding work to be performed.

Based on these factors, and possibly others as best suits a particular application, the method of FIG. 2 or the hybrid printer driver (114, FIG. 1) can determine whether that print job unit then under consideration will be most efficiently rendered, i.e., most quickly rendered, on the host computer or the printer (determination 202). As will be appreciated by those skilled in the art, "rendered" in this context may refer to converting the print job to rasterized data or converting the print job to some intermediate format short of rasterization. The criteria for making the determination as to whether the host computer or printer can most efficiently render any given print job unit are as outlined above. How much rendering should be optimally performed by, for example, the host computer, can also be determined from these factors by the current method.

If the print job unit is most efficiently rendered by the host computer (determination 202), that print job unit is fully or partially rendered by the host computer (step 203). The job is rendered in a device independent color space and may be rendered or simplified by the job, page or strip. As noted above, how much of the rendering should be optimally performed by the host computer can also be determined by this method, e.g., by the hybrid printer driver (114), with the host computer rendering the print job data accordingly.

After rendering on the host, the print job data for that print job unit is transmitted to the printer (step 204). This transmission may also include compressing the data for transmission.

In some examples, the print job data has been rasterized by the host computer and can be delivered to the print engine controller (104) without further processing. In other examples, the print job data may have only been partially rendered on the host computer and may need to be delivered to, for example, the rasterizer (103) of the printer (110) for further processing prior to printing. That print job unit is then printed (step 207). This continues until the entire print job has been printed.

Alternatively, if the print job unit in question is most efficiently rendered by the host computer (determination 202), that print job unit is transmitted to the printer (110, FIG. 1), for example, in a traditional PDL format, (step 205). The printer (110) then uses its own resources, such as the page converter (102) and rasterizer (103) to render the print job unit. Once rasterized, the print job unit is sent to the print engine controller and printed (step 207).

Consequently, the printing system described herein dynamically switches between host-based and printer-based rendering to maximize efficiency. However, the user may, in some embodiments, be given the ability to override this default behavior if she determines that, under prevailing circumstances, only one of host-based or printer-based rendering is desired. This is done by accessing an options menu of the hybrid printer driver (114) using the user interface of the host computer (112). The user can then activate or deactivate use of the imaging algorithm (115). The user can also specify whether rendering is to be performed entirely by the host (112) or the printer (110) or what portions of the rendering process are to be performed by each. This configuration can be made on either a driver global or per-application basis. Alternately a configuration file can be modified to change these settings. This allows an administrator to deploy specific required settings without end-user interaction. In this way, the system can be exactly tailored to the preferences and operating circumstances of the user.

Operation of the optimized rendering solution embodied in the hybrid printer driver (114, FIG. 1) and the method of FIG. 2, as described herein, isn't obvious to the casual user and can be entirely automated as described herein. However, performance improvements of 2 to 20 times have been observed in testing of the principles described herein.

Moreover, complex print jobs can require significant memory on the printer to image. Some of these jobs will even exhaust the memory resourced available on the printer, possibly resulting in loss of a printed page. However, by analyzing the job and making the appropriate decision, the hybrid printer driver (114) can anticipate and thus reduce or eliminate these memory overrun situations.

The preceding description has been presented only to illustrate and describe embodiments of the invention. It is not intended to be exhaustive or to limit the invention to any precise form disclosed. Many modifications and variations are possible in light of the above teaching.

What is claimed is:

1. A printing system for processing a print job comprising;
a host computer; and
a printer in communication with said host computer;
wherein said host computer comprises a printer driver that determines whether each print job unit can be more efficiently rendered on said host computer or on said printer and processes said print job accordingly;
wherein said print job unit comprises one of a fraction of an entire print job, said fraction of the entire print job being either a page of print job or a strip of print job page.

2. The system of claim 1, wherein said printer driver determines whether each print job unit can be more rapidly rendered on said host computer or on said printer.

3. The system of claim 1, wherein said printer driver comprises a rendering function that renders said print job unit to a rasterized format.

4. The system of claim 1, wherein said printer driver determines whether said print job unit is more efficiently rendered on said host computer or on said printer based on at least one of (1) printer hardware configuration; (2) host computer hardware configuration; (3) a current application on said host computer; (4) content of the print job unit; (5) any applicable user input; (6) connection bandwidth between the host computer and printer; (7) whether the host computer and printer are connected directly or by a network and whether any part of the connection is wireless; and (8) whether the printer is shared by other host computers or is dedicated to said host.

5. The system of claim 1, wherein an imaging algorithm of said printer driver that determines where to render each print job unit can be selectively activated or deactivated by a user operating said host computer.

6. The system of claim 1, wherein said print job unit is partially rendered on said host computer and partially rendered on said printer.

7. A method of processing a print job comprising a printer driver determining whether each step in rendering a print job unit of said print job can be more rapidly completed on a host computer or on a printer, and rendering said print job accordingly.

8. The method of claim 7, wherein said rendering comprising converting said print job unit from a Page Description Language format to a rasterized format.

9. The method of claim 7, further comprising converting said print job unit to a rasterized format on said host computer.

10. The method of claim 7, further comprising converting said print job unit to a display list format on said host computer and transmitting said print job unit in display list format to said printer.

11. The method of claim 7, wherein said print job unit comprises one of a complete print job, a page of print job or a strip of print job page.

12. The method of claim 7, further comprising determining whether each step in rendering a print job unit of said print job is more rapidly completed on said host computer or on said printer based on at least one of (1) printer hardware configuration; (2) host computer hardware configuration; (3) a connection bandwidth between the host computer and printer; and (4) content of the print job unit.

13. The method of claim 12, further comprising determining whether each step in rendering a print job unit of said print job is more efficiently completed on said host computer or on said printer based on at least one of (1) whether the host computer and printer are connected directly or by a network and whether any part of the connection is wireless; and (2) whether the printer is shared by other host computers or is dedicated to said host.

14. The method of claim 7, further comprising determining whether each step in rendering a print job unit of said print job is more efficiently completed on said host computer or on said printer based on at least one of (1) a current application on said host computer; and (2) any applicable user input.

15. The method of claim 7, further comprising allowing a user operating said host computer to selectively activate or deactivate an algorithm determining whether each step in rendering a print job unit of said print job can be most efficiently completed on a host computer or on a printer.

16. A printer driver stored on a non-transitory medium for storing processor-readable instructions, wherein said printer driver, when executed, determines whether each step in rendering a print job unit of said print job can be most efficiently completed on a host computer or on a printer, and renders said print job accordingly.

17. The printer driver of claim 16, wherein said print job unit comprises one of a completed print job, a page of print job, a strip of print job page or any object on a page.

18. The printer driver of claim 16, wherein said driver determines whether each step in rendering a print job unit of said print job is more efficiently completed on said host computer or on said printer based on at least one of (1) printer hardware configuration; (2) host computer hardware configuration; (3) a connection between the host computer and printer; and (4) content of the print job unit.

19. The printer driver of claim 16, wherein said driver determines whether each step in rendering a print job unit of said print job is more efficiently completed on said host computer or on said printer based on at least one of (1) whether the host computer and printer are connected directly or by a network and whether any part of the connection is wireless; and (2) whether the printer is shared by other host computers or is dedicated to said host.

20. The printer driver of claim 16, wherein said driver determines whether each step in rendering a print job unit of said print job is more efficiently completed on said host computer or on said printer based on at least one of (1) a current application on said host computer; and (2) any applicable user input.

21. The printer driver of claim 16, wherein said driver allows a user operating said host computer to selectively activate or deactivate an algorithm determining whether each step in rendering a print job unit of said print job can be most efficiently completed on a host computer or on a printer.

22. A system of processing a print job comprising:
   means for determining whether each step in rendering a print job unit of said print job can be most efficiently completed on a host computer or on a printer; and
   means for rendering said print job accordingly using either or both said host computer and said printer.

\* \* \* \* \*